(12) United States Patent
Cho

(10) Patent No.: US 9,927,075 B2
(45) Date of Patent: Mar. 27, 2018

(54) LED LIGHTING MODULE FOR PLANT FACTORY AND LED LIGHTING DEVICE FOR PLANT FACTORY HAVING SAME MOUNTED THEREON

(71) Applicant: FUTUREGREEN AGRICULTURAL CO., LTD., Suwon-si, Gyeonggi-do (KR)

(72) Inventor: Sung-Bin Cho, Suwon-si (KR)

(73) Assignee: FUTUREGREEN AGRICULTURAL CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 14/782,996

(22) PCT Filed: May 26, 2014

(86) PCT No.: PCT/KR2014/004685
§ 371 (c)(1),
(2) Date: Oct. 7, 2015

(87) PCT Pub. No.: WO2014/204108
PCT Pub. Date: Dec. 24, 2014

(65) Prior Publication Data
US 2016/0178140 A1 Jun. 23, 2016

(30) Foreign Application Priority Data

Jun. 20, 2013 (KR) .................. 10-2013-0070956
May 23, 2014 (KR) .................. 10-2014-0062372

(51) Int. Cl.
*A01G 7/04* (2006.01)
*F21K 99/00* (2016.01)
(Continued)

(52) U.S. Cl.
CPC ............... *F21K 9/56* (2013.01); *A01G 7/045* (2013.01); *F21K 9/64* (2016.08); *F21V 19/0035* (2013.01);
(Continued)

(58) Field of Classification Search
CPC ... F21K 9/56; F21K 9/64; A01G 7/045; F21V 19/0035; Y02P 60/149
(Continued)

(56) References Cited

U.S. PATENT DOCUMENTS 7,946,724 B2 *  5/2011  Shin .................. G02F 1/133603
                                                  362/230
2009/0161356 A1 *  6/2009  Negley ............. H05B 33/0803
                                                  362/231
(Continued)

FOREIGN PATENT DOCUMENTS

CA       2760291      * 11/2010  ......... G02F 1/13357
JP    2011-155948 A     8/2011
(Continued)

*Primary Examiner* — Anabel Ton
(74) *Attorney, Agent, or Firm* — John K. Park; Park Law Firm

(57) ABSTRACT

The present invention relates to technology to implement a technique of managing light intensity by each wavelength band for a light apparatus at a low price, whereby the light intensity is suitable for plant growth. In the present invention, cheaper LED blue-chips are incorporated instead of more expensive LED red-chips which are conventionally incorporated in plant factories, which let the production cost of lighting apparatus for plant factories reduced. By applying red-series, green-series and yellow-series phosphors onto the LED blue-chips, light intensity by wavelength band of lighting apparatuses may meet target conditions which are favorable to plant growth. Further, work environment may be improved by reducing eyestrain due to red light-source,
(Continued)

and growth efficiency of plants may be enhanced by improving wavelength characteristics of lighting apparatuses.

4 Claims, 14 Drawing Sheets

(51) Int. Cl.
*F21V 19/00* (2006.01)
*F21K 9/64* (2016.01)
*F21Y 103/10* (2016.01)
*F21Y 115/10* (2016.01)

(52) U.S. Cl.
CPC ....... *F21Y 2103/10* (2016.08); *F21Y 2115/10* (2016.08); *Y02P 60/149* (2015.11)

(58) Field of Classification Search
USPC .......................................................... 362/249
See application file for complete search history.

(56) References Cited

U.S. PATENT DOCUMENTS

| 2012/0161170 | A1  | 6/2012  | Dubue et al. |
| 2012/0218750 | A1* | 8/2012  | Klase ................... F21V 5/007 362/231 |
| 2013/0187180 | A1* | 7/2013  | Chen ................... A01G 7/045 257/98 |
| 2013/0264934 | A1  | 10/2013 | Osaki et al. |
| 2016/0116121 | A1* | 4/2016  | Hu ................... G02F 1/133603 362/84 |

FOREIGN PATENT DOCUMENTS

| KR | 10-1024193 B1 | 3/2011 |
| KR | 10-1050504 B1 | 7/2011 |
| KR | 10-2011-0131564 | 12/2011 |
| WO | WO2012-070435 A1 | 5/2012 |

* cited by examiner

US 9,927,075 B2

LED LIGHTING MODULE FOR PLANT FACTORY AND LED LIGHTING DEVICE FOR PLANT FACTORY HAVING SAME MOUNTED THEREON

FIELD OF THE INVENTION

The present invention relates to technology to implement a technique of managing light intensity by each wavelength band for a light apparatus at a low price, whereby the light intensity is suitable for plant growth.

In the present invention, cheaper LED blue-chips are incorporated instead of more expensive LED red-chips which are conventionally incorporated in plant factories, which let the production cost of lighting apparatus for plant factories reduced. By applying red-series, green-series and yellow-series phosphors onto the LED blue-chips, light intensity by wavelength band of lighting apparatuses may meet target conditions which are favorable to plant growth. Further, work environment may be improved by reducing eyestrain due to red light-source, and growth efficiency of plants may be enhanced by improving wavelength characteristics of lighting apparatuses.

More specifically, the present invention implements LED lighting modules and LED lighting apparatuses which show a first peak in blue-series wavelength band (450 nm) and a second peak in red-series wavelength band (660 nm) so as to enhance overall plant growth.

BACKGROUND ART

Plants grow by absorbing nutrients and water through their roots and producing energy in their leaves by photosynthesis. The energy for plant growth is produced by photosynthesis, in which light energy is the most critical factor.

Plants grown in the open field are simply supplied light energy by the natural light (i.e., sunlight). However, regarding to plants grown in plant factories or indoor environment, artificial light which is similar to the natural light is utilized in order to manage plant growth.

There are a number of ways to implement the artificial light. It is crucial to provide light intensity characteristics of the artificial light which is favorable to plant growth, which is the core technology in plant factories.

Conventionally, 3-band radiation lamps are commonly used for the artificial light. However, the 3-band radiation lamps are disadvantageous in that power consumption is large and life-time is short. Further, the 3-band radiation lamps are unfavorable to plant growth.

In order to overcome these disadvantages, various lighting apparatuses have been developed with incorporating LEDs. They usually incorporate red-chips in order to implement red-series wavelength band which are crucial to plant growth. They may add blue LEDs or white LEDs to these red-chips so as to implement some target wavelength bands.

However, the red-chips are much more expensive and have much larger power consumption than blue-chips, by which the red-chips are disadvantageous from the operational perspective of plant factories. Despite of the disadvantages, the red-chips are usually incorporated for implementing red-series wavelength band.

Therefore, the technology of the present invention is required, in which light intensity by wavelength bands of lighting apparatuses are arranged by applying red-series phosphor, green-series phosphor, yellow-series phosphor and RGY-phosphor to LED blue-chips, by which the production cost of lighting apparatuses for plant factories is reduced and plant growth is enhanced by improving wavelength characteristics of the lighting apparatuses.

REFERENCE TECHNOLOGIES

1. LED Lighting apparatus for plant factories and Manufacturing Method of the same (KR patent application No. 10-2010-0028266)
2. Apparatus for Culturing Dye Plants Using LED Light-Source (KR patent application No. 10-2003-0078989)
3. LED Modules and Manufacturing Method of the same (KR patent application No. 10-2009-0008331)
4. LED Lighting Modules (KR patent application No. 10-2009-0049401)

DISCLOSURE OF INVENTION

Technical Problem

It is an object of the present invention to provide LED lighting technology for plant factories which may enhance plant growth by managing light intensity by each wavelength band even though incorporating LED blue-chips which are cheaper than conventional LED red-chips.

It is another object of the present invention to provide LED lighting technology for plant factories which may make uniform plant growth by implementing the feature of particular light intensity by wavelength bands into a single chip so as to remove the risk of change in target condition in use of lighting apparatus.

Technical Solution

In order to achieve the object, an LED lighting module for plant factories of the present invention comprises: a blue-chip light-source 10 for generating blue-series light under external power supply; and RGY-phosphor, which being blending of yellow-series phosphor, green-series phosphor and red-series phosphor, for being applied onto the blue-chip light-source, whereby the light intensity out of the blue-chip light-source shows a first local maximum in 625 nm-700 nm wavelength band and a second local maximum in 430 nm-470 nm wavelength band and maintains higher in 550 nm-660 nm wavelength band than the second local maximum, wherein the first local maximum is the largest intensity value and wherein the second local maximum is smaller than the first local maximum.

Further, an LED lighting module for plant factories of the present invention comprises: a blue-chip light-source 10 for generating blue-series light under external power supply; and mixing phosphor 20, which including red-series R-phosphor, for being applied onto the blue-chip light-source, whereby the light intensity out of the blue-chip light-source shows a first local maximum in 430 nm-470 nm wavelength band and a second local maximum in 600 nm-730 nm wavelength band, wherein both of minimum light intensities in 430 nm-470 nm and 600 nm-730 nm wavelength bands maintain higher than maximum light intensity in 490 nm-560 nm wavelength band.

Further, an LED lighting module for plant factories of the present invention comprises: a blue-chip light-source 10 for generating blue-series light under external power supply; and mixing phosphor 20, which being blending of red-series and green-series RG-phosphor, for being applied onto the blue-chip light-source, whereby the light intensity out of the blue-chip light-source shows a first local maximum in 430 nm-470 nm wavelength band, a second local maximum in 600 nm-730 nm wavelength band, and a third local maximum in 490 nm-560 nm wavelength band, wherein the third local maximum is smaller than both of the first and the second local maximums.

Further, an LED lighting module for plant factories of the present invention comprises: a blue-chip light-source 10 for generating blue-series light under external power supply; and mixing phosphor 20, which being blending of red-series and yellow-series RY-phosphor, for being applied onto the blue-chip light-source, whereby the light intensity out of the blue-chip light-source shows a first local maximum in 430 nm-470 nm wavelength band and a second local maximum in 550 nm-730 nm wavelength band, wherein both of minimum light intensities in 430 nm-470 nm and 550 nm-730 nm wavelength bands maintain higher than maximum light intensity in 490 nm-530 nm wavelength band.

An LED lighting apparatus for plant factories of the present invention comprises: LED lighting modules 100 as set forth above; a circuit board 200 for loading pluralities of the LED lighting modules and of having circuit pattern so as to provide on/off control for the LED lighting modules and to provide external power supply to the LED lighting modules; and a frame 300 for fixing the circuit board with letting the bottom surface of the circuit board being landed.

The LED lighting apparatus for plant factories of the present invention may further comprises: a closing cover 400, being detachably attached to the bottom edges of the frame, for closing the circuit board and the LED lighting modules, wherein the circuit board being landed in the frame and the LED lighting modules being loaded in the circuit board.

In the present invention, it is preferable that the pluralities of LED lighting modules are in-line aligned with being equally-spaced in the circuit board.

Advantageous Effects

The LED lighting technology for plant factories of the present invention may provide advantages as set below.

(1) Plant growth in plant factories may be enhanced by implementing the light intensity having peaks in blue-series wavelength band (450 nm) and red-series wavelength band (660 nm) even though incorporating LED blue-chips which are cheaper than conventional LED red-chips.

(2) Growth efficiency of plants may be enhanced respectively by selectively and differently blending red-series phosphor, red-series plus green-series phosphor, or red-series plus yellow-series phospor so as to implement the light intensity by wavelength bands which are conforming to each plant.

(3) Plant growth may be uniformly achieved by implementing the feature of particular light intensity by wavelength bands into a single chip by applying mixing phosphor on surface of blue-chip light-sources so as to remove the risk of change in target condition in use of lighting apparatus.

(4) Production cost may be reduced by incorporating cheap LED blue-chips instead of expensive LED red-chips which are conventionally adopted in a lighting apparatus for plant factories.

(5) Work environment may be improved by reducing eyestrain which was incurred due to red light-source.

(6) The present invention may be easily implemented into a single LED chip simply by applying mixing phosphor (RGY-phosphor, red-series phosphor, or any phosphor of red-series blended by green-series or yellow-series) on surface of blue-chip light-sources respectively.

EMBODIMENT FOR CARRYING OUT THE INVENTION

The present invention is described below in detail with reference to the drawings.

Figure 1:
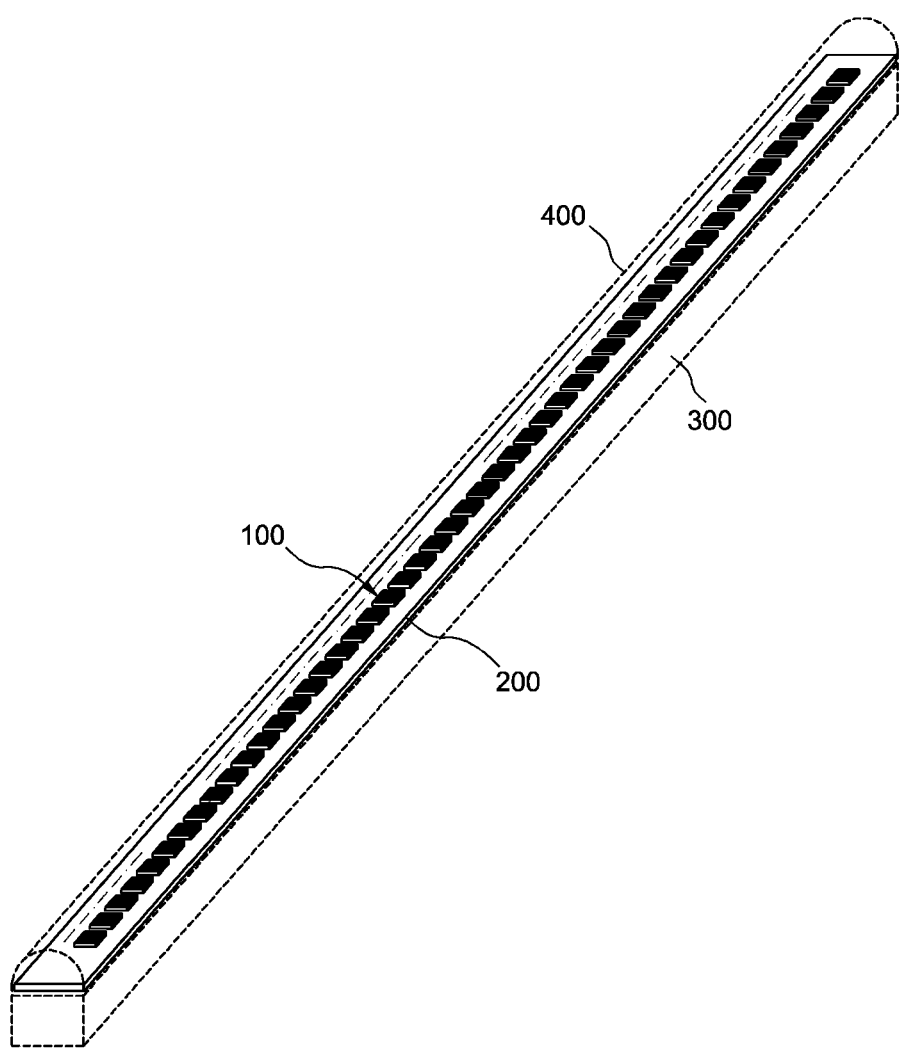
FIG. 1 shows an embodiment of an LED lighting apparatus for plant factories of the present invention.
Figure 2:
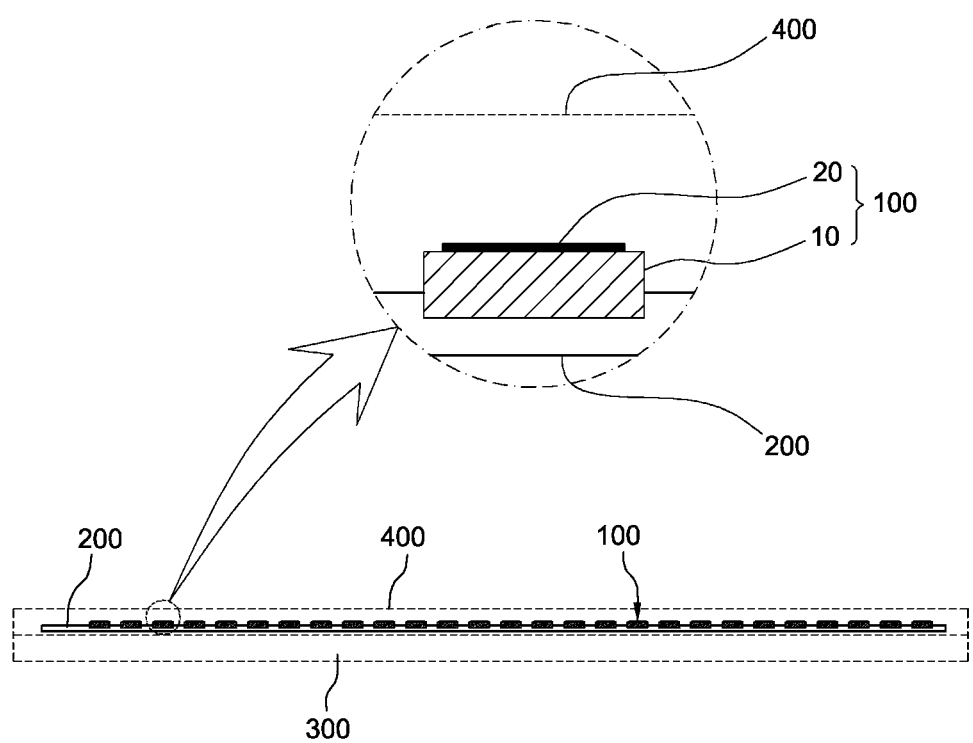
FIG. 2 is an enlarged view of an LED lighting apparatus and an LED lighting module for plant factories of the present invention.

FIG. 1 shows an embodiment of an LED lighting apparatus for plant factories of the present invention. FIG. 2 is an enlarged view of an LED lighting apparatus and an LED lighting module for plant factories of the present invention.

Referring to FIGS. 1 and 2, an LED lighting modules 100 for plant factories of the present invention is installed in an LED lighting apparatus, and includes a blue-chip light-source 10 and phosphor 20. The phosphor 20 may be RGY-phosphor (Red Green Yellow phosphor) or mixing phospher. The mixing phospher may be R-phosphor which is red-series, RG-phosphor which is blending of red-series and green-series, or RY-phosphor which is blending of red-series and yellow-series.

The blue-chip light-source 10 generates and emits blue-series light when driven by external power supply. When the phosphor 20 is applied on surface of the blue-chip light-source 10, the combination of the blue-chip light-source 10 and phosphor 20 implements light with red-series wavelength band strengthened.

First, there is provided an embodiment where the phosphor 20 is implemented as RGY-phosphor.

The RGY-phosphor 20 is blending of yellow-series phosphor, green-series phosphor and red-series phosphor. The RGY-phosphor 20 is applied on surface of a blue-chip light-source 10 so that the light intensity out of the blue-chip light-source 10 shows a first local maximum in 625 nm-700 nm wavelength band and a second local maximum in 430 nm-470 nm wavelength band and maintains higher in 550 nm-660 nm wavelength band than the second local maximum, in which the first local maximum is the largest intensity value and wherein the second local maximum is smaller than the first local maximum.

A light intensity is generated by a blue-chip light-source 10 which emits blue-series light. When the light passes through the RGY-phosphor 20 on the surface of the blue-chip light-source 10, the light intensity becomes to have a characteristics of showing a first local maximum in 625 nm-700 nm wavelength band and a second local maximum in 430 nm-470 nm wavelength band and of maintaining higher in 550 nm-660 nm wavelength band than the second local maximum, in which the first local maximum is the largest intensity value and the second local maximum is smaller than the first local maximum.

Then, there is provided embodiments where the phosphor 20 is implemented as mixing phosphor.

In a first embodiment of the present invention, the mixing phosphor 20 is made of red-series R-phosphor. In the first embodiment, it is preferable that the light intensity from blue-chip light-source 10 shows a first local maximum in 430 nm-470 nm wavelength band and a second local maximum in 600 nm-730 nm wavelength band. Further, both of minimum light intensities in 430 nm-470 nm and 600 nm-730 nm wavelength bands maintain higher than maximum light intensity in 490 nm-560 nm wavelength band.

In a second embodiment of the present invention, the mixing phosphor 20 is made by blending red-series and green-series RG-phosphor. In the second embodiment, it is preferable that the light intensity from blue-chip light-source 10 shows a first local maximum in 430 nm-470 nm wavelength band, a second local maximum in 600 nm-730 nm wavelength band, and a third local maximum in 490 nm-560 nm wavelength band. The third local maximum is smaller than both of the first and the second local maximums.

In a third embodiment of the present invention, the mixing phosphor 20 is made by blending red-series and yellow-series RY-phosphor. In the third embodiment, it is preferable that the light intensity from blue-chip light-source 10 shows a first local maximum in 430 nm-470 nm wavelength band and a second local maximum in 550 nm-730 nm wavelength band. Both of minimum light intensities in 430 nm-470 nm and 550 nm-730 nm wavelength bands maintain higher than maximum light intensity in 490 nm-530 nm wavelength band.

The mixing phospher 20 of the present invention is fluorescent materials, and may be implemented by blending phosphors of various color series.

Further, the mixing phosphor 20 is applied on surface of LED chips. Each LED chip (e.g., blue-chip light-source) shows specific light intensities by wavelength bands. The mixing phosphor which is applied onto LED chips constitutes a combination with the light sources (e.g., blue-chip light-source) so as to form particular light intensities in specific wavelength bands.

That is, target condition (e.g., a graph of relative intensity versus wavelengths) is determined so that it contains relative light intensity by wavelength bands of lights out of the mixing phosphor 20. Then, the blending of mixing phosphor 20 shall be automatically fixed up corresponding to the target condition. The target condition may be determined with considering relative light intensities in yellow-series, green-series and red-series, respectively.

Further, in the relative art of the invention, when a target condition is determined for LED lighting modules 100, dedicated tools (e.g., phosphor-blending softwares) may be utilized so as to automatically blend particular series of phosphors corresponding to the target condition. Therefore, an ordinary skilled in the art may determine a target condition of a light source, and then utilize dedicated tools so as to blend phosphors for producing phosphor 20 corresponding to the target condition.

As described above, an ordinary skilled in the art may implement mixing phosphor 20 corresponding to a target condition without knowing of blending ratio for the mixing phosphor 20.

The LED lighting apparatus for plant factories of the present invention loads pluralities of LED lighting modules 100, and includes a circuit board 200, a frame 300, and a closing cover 400.

The LED lighting modules 100 is constructed with a blue-chip light-source 10 for generating blue-series light under external power supply, whose surface is applied with phosphor 20 for modifying properties of the light. The phosphor 20 is preferably applied onto surface of the blue-chip light-source 10, but may be attached as a form of sticker.

The circuit board 200 loads pluralities of LED lighting modules 100, and has circuit pattern so as to provide on/off control and external power supply for the LED lighting modules 100. It is preferable that the pluralities of LED lighting modules 100 are in-line aligned with being equally-spaced in the circuit board 200.

The frame 300 fixes the circuit board 200 with letting bottom surface of the circuit board 200 being landed. Further, the frame 300 is fixed to support frame of plant factories so as to support the lighting apparatus.

The closing cover 400 is detachably attached to the bottom edges of the frame 300, and closes the circuit board 200 and the LED lighting modules 100, where the circuit board 200 is landed in the frame 300 and the LED lighting modules 100 are loaded in the circuit board 200. The closing cover 400 may be made of glass or synthetic resin, and preferably of light synthetic resin.

Target condition of lighting apparatus for plant factories in the present invention is described below in detail with reference to FIGS. 3 and 4.

Figure 3:
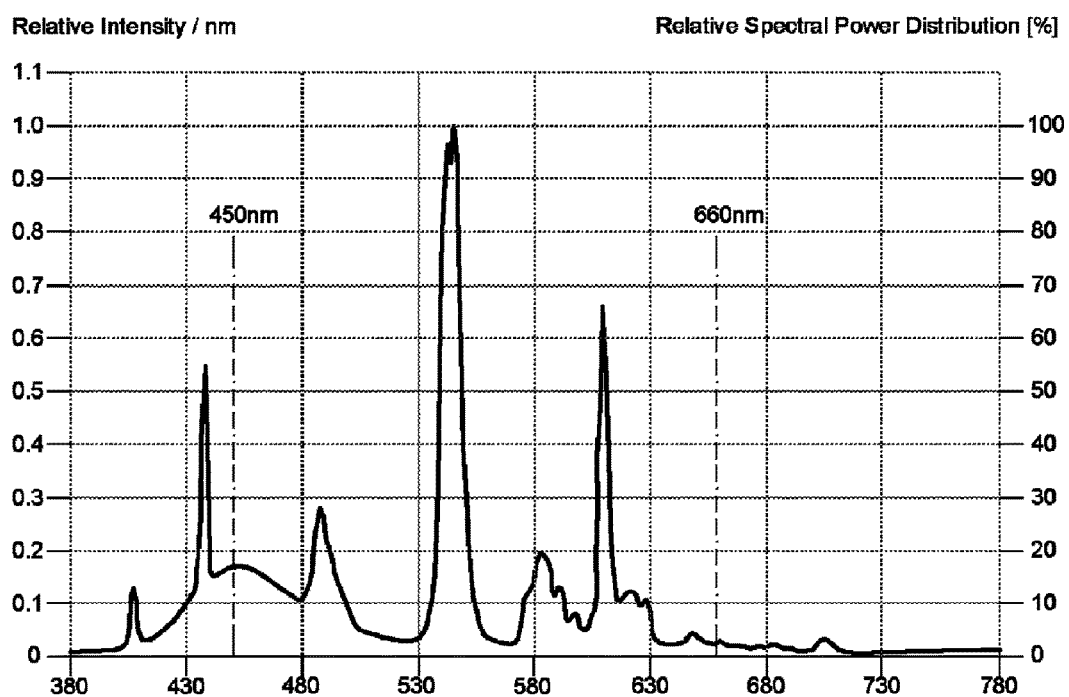
FIG. 3 shows wavelength of conventional fluorescent lamps.

FIG. 3 shows wavelength of conventional fluorescent lamps. FIG. 4 shows target condition for specific wavelength bands of an LED lighting apparatus for plant factories with applying RGY-phosphor 20 of the present invention. FIG. 4 roughly describes target conditions for specific portions of wavelength bands without drawing continuous parts.

First, referring to FIG. 3, conventional 3-band radiation lamps shows very weak light intensity in 660 nm wavelength band, which is very critical for plant growth. Further, conventional 3-band radiation lamps show high power consumption and short life-time.

Figure 4:
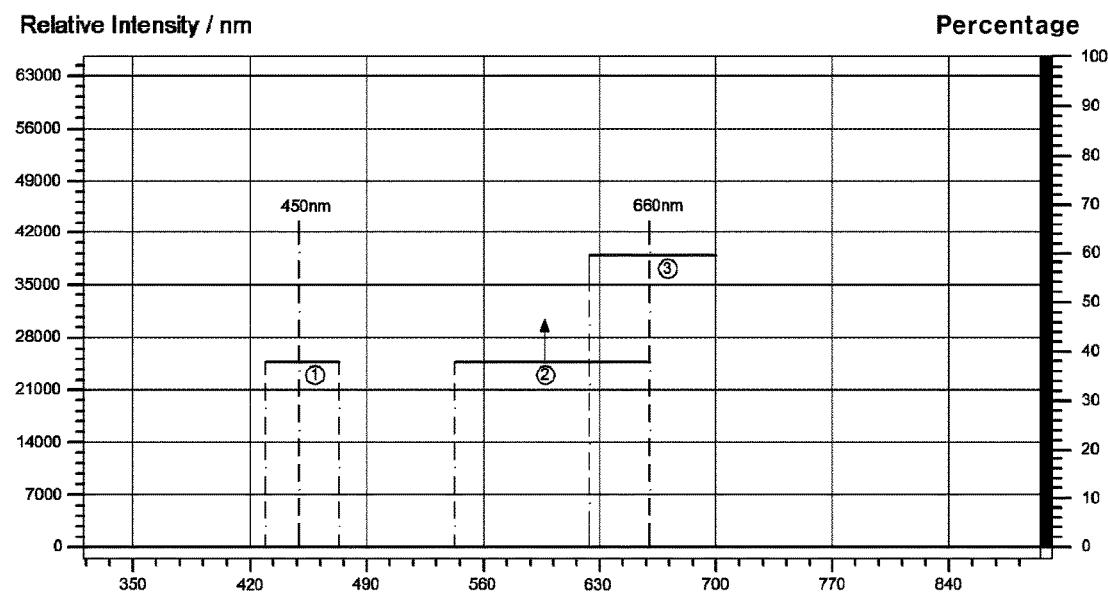
FIG. 4 shows target condition of an LED lighting apparatus with applying RGY-phosphor of the present invention.

However, referring to FIG. 4, RGY-phosphor 20 is implemented by blending yellow-series phosphor, green-series phosphor and red-series phosphor, and is applied on surface of the blue-chip light-source 10. The light intensity out of the blue-chip light-source 10 shows a first local maximum in 625 nm-700 nm wavelength band, in which the first local maximum is the largest intensity value. The light intensity shows a second local maximum in 430 nm-470 nm wavelength band, in which the second local maximum is smaller than the first local maximum. Further, the light intensity maintains higher in 550 nm-660 nm wavelength band than the second local maximum. That is, the light intensity shows the first local maximum in band ③ and the second local maximum in band ①. Further, the light intensity maintains higher in band ② than the second local maximum.

The advantageous effects which are attained by forming the light intensities per wavelength bands described above may be discovered in the detailed description with referring to FIGS. 8 to 13.

Figure 5:
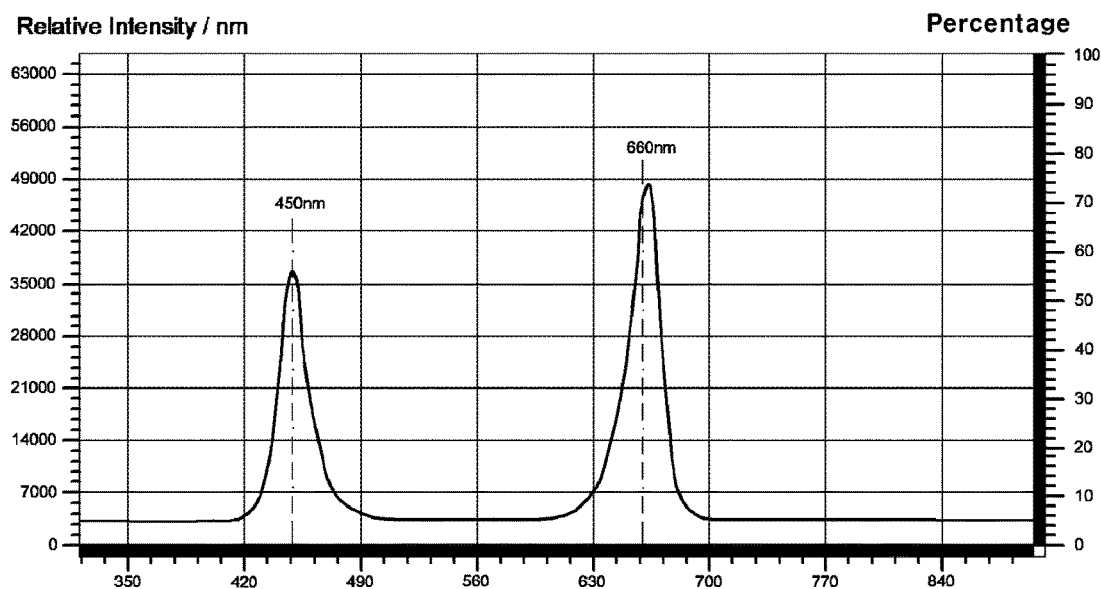
FIGS. 5 and 6 show wavelength of LED lighting apparatus of prior art.
Figure 6:
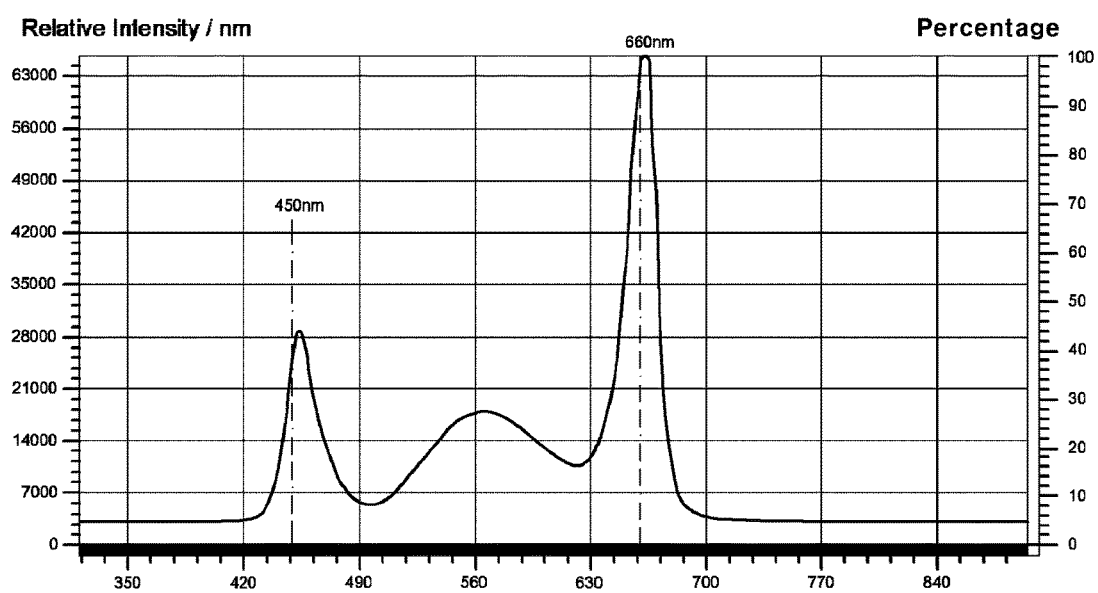

Referring to FIGS. 5 and 6, there is provided a conventional lighting apparatus for plant factories in which red LEDs are used.

FIG. 5 shows wavelength of LED lighting apparatus of prior art, which is a combination of red LEDs and blue LEDs. Further, FIG. 6 shows wavelength of LED lighting apparatus of prior art, which is a combination of conventional white LEDs and red LEDs. In FIG. 5, it was tested through a lighting apparatus in which approximately five red LEDs per one blue LED were linearly arranged and further in which power supply for the red LEDs and blue LEDs was controlled so as to confirm the target condition of light intensity. In FIG. 6, it was tested through a lighting apparatus in which approximately two red LEDs per one white LED were linearly arranged and further in which power supply for the red LEDs and white LEDs was controlled so as to meet the target condition of light intensity.

Referring to FIG. 5, the light intensity of the lighting apparatus shows peaks in blue-series 450 nm wavelength band and red-series 660 nm wavelength band. However, it maintains relatively lower in 550 nm-660 nm wavelength band than in 450 nm wavelength band, which weakens plant growth.

Referring to FIG. 6, the light intensity of the lighting apparatus shows peaks in blue-series 450 nm wavelength band and red-series 660 nm wavelength band. However, the lower intensity in 550 nm-660 nm wavelength band than in 450 nm wavelength band shall weaken plant growth, as described above with referring to FIG. 5. Those test results may be discovered in the detailed description with referring to FIGS. 8 to 13.

As shown in FIGS. 5 and 6, in conventional art for manufacturing lighting apparatuses, in order to implement relatively higher light intensity in 450 nm and 660 nm wavelength bands, pluralities of LEDs for particular colors were arranged in combination and power supply for the LEDs was controlled so as to meet the target condition of light intensity. The conventional art is prone to incur errors in the course of fix up light intensity for the target condition and then mechanically arranging pluralities of LEDs. Further, lighting apparatuses of the conventional art are prone to incur problem in use due to un-uniform durability of the pluralities of LEDs.

Figure 7:
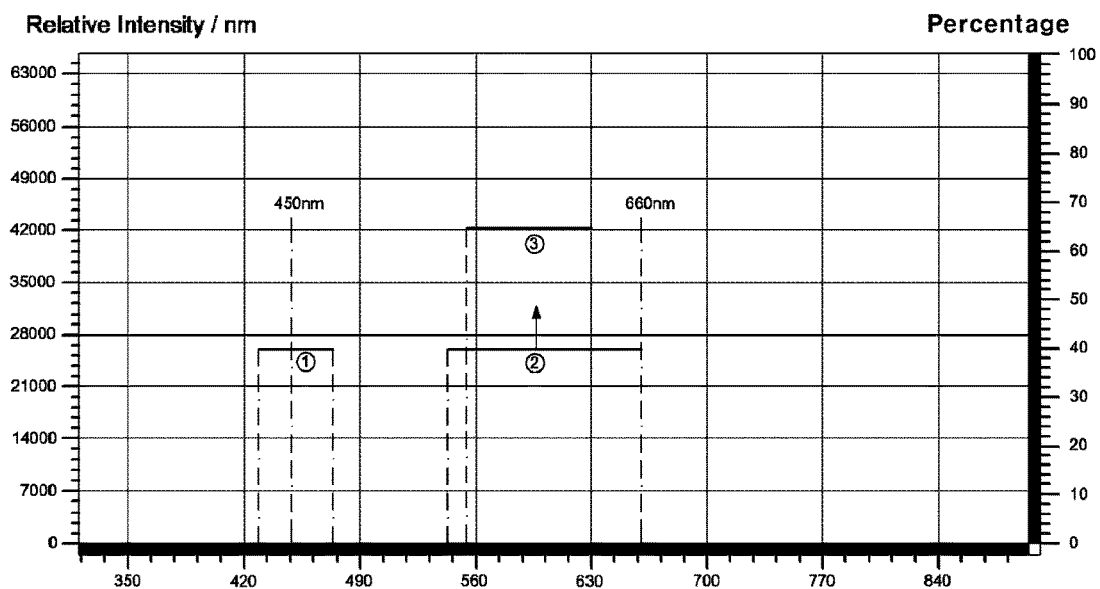
FIG. 7 shows target condition of a white LED lighting apparatus with red-series wavelength band strengthened of the present invention.

FIG. 7 shows target condition for specific wavelength bands of a white LED lighting apparatus with red-series wavelength band strengthened of the present invention. FIG. 7 roughly describes target conditions for specific portions of wavelength bands without drawing continuous parts.

Referring to FIG. 7, the light intensity of the lighting apparatus shows a peak in blue-series 450 nm wavelength band, and maintains relatively higher in 550 nm-660 nm wavelength band than in 450 nm wavelength band. However, failing to show a peak of light intensity in a red-series 660 nm wavelength band has weakened plant growth. That is, the light intensity shows the second local maximum in band ①, and maintains relatively higher in band ② than the second local maximum. However, although the light intensity shows the first local maximum in band ③, failing to show a peak in 660 nm wavelength band weakens plant growth.

FIGS. 8 to 13 show experiment result of growth status of plants such as "Caesars Red", "Lettuce", and "Caesars Green" for each lighting apparatus under the condition as shown in [Table 1]. According to experiment result on "Caesars Red", "Lettuce", and "Caesars Green" as shown in FIGS. 8-13, a lighting apparatus of the present invention (white LED) generally shows superior level of plant growth to a lighting apparatus including combinations of white LEDs and red LEDs, in which the present invention incorporates cheaper blue-chips of low power consumption whereas the red LEDs incorporates more expensive conventional red-chips of high power consumption. FIGS. 8-13 further shows that a lighting apparatus including fluorescent lamps shows inferior level of plant growth than a lighting apparatus of the present invention or a lighting apparatus including combinations of white LEDs and red LEDs, although the lighting apparatus including fluorescent lamps consumes more power than the other lighting apparatuses.

TABLE 1

|  | Fluorescent Lamp | White LED + Red LED | Embodiment |
| --- | --- | --- | --- |
| Vertical Height | 18 cm | 18 cm | 21 cm |
| Illumination | 8,920 lux | 7,490 lux | 7,650 lux |
| PPFD | 123 uMol/ m2 · sec | 133 uMol/ m2 · sec | 115 uMol/ m2 · sec |
| Power Consumption | 32 W | 18 W | 19 W |

The vertical height means the distance from the LED lighting modules 100 and the measuring points.

Figure 8:
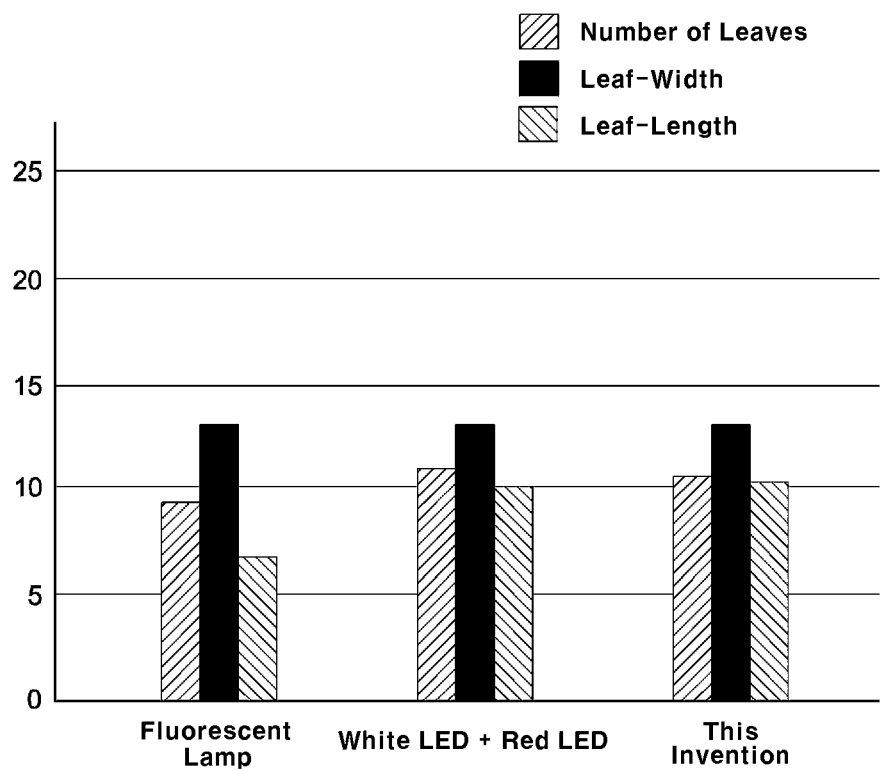
FIGS. 8 and 9 show comparison of growth status of "Caesars Red" for each lighting apparatus.
Figure 9:
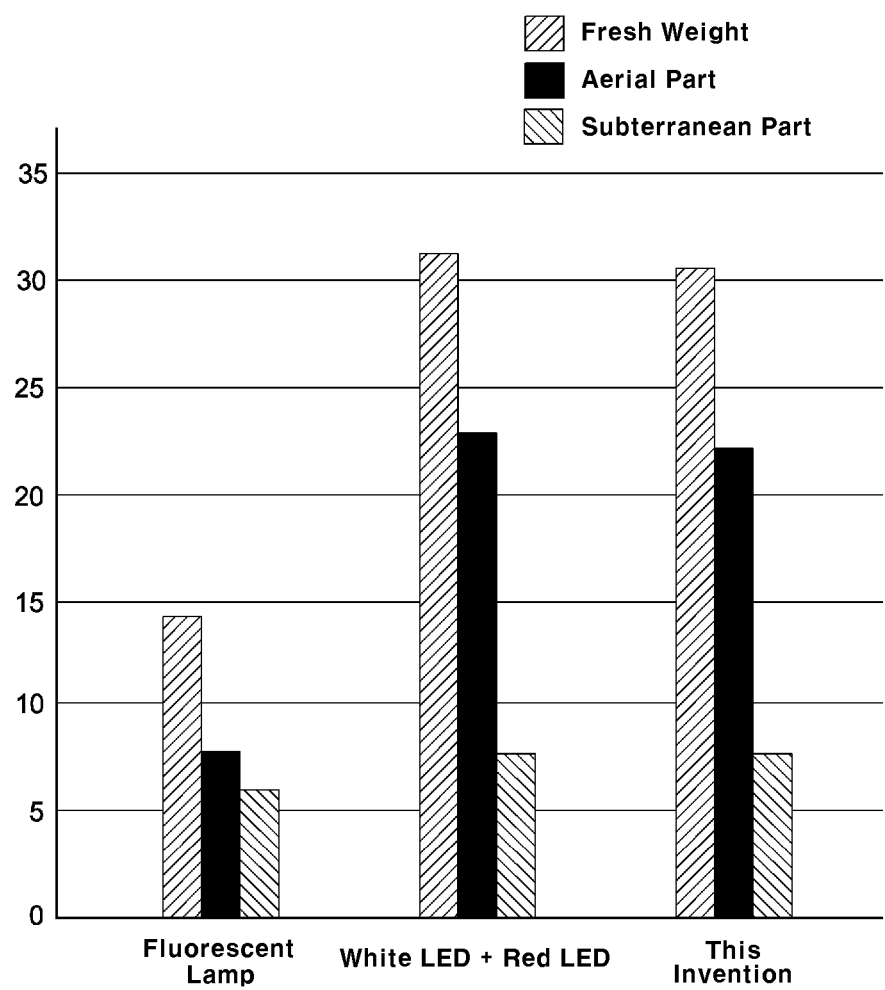

FIGS. 8 and 9 show comparison of growth status of "Caesars Red" for fluorescent lamps, a lighting apparatus including combinations of white LEDs and red LEDs, and a lighting apparatus of the present invention.

Referring to FIGS. 8 and 9, the lighting apparatus including combinations of white LEDs and red LEDs shows approximately equivalent level of "Caesars Red" growth with the lighting apparatus of the present invention, in which the red LEDs incorporates more expensive red-chips of high power consumption whereas the present invention incorporates cheaper blue-chips of low power consumption.

Figure 10:
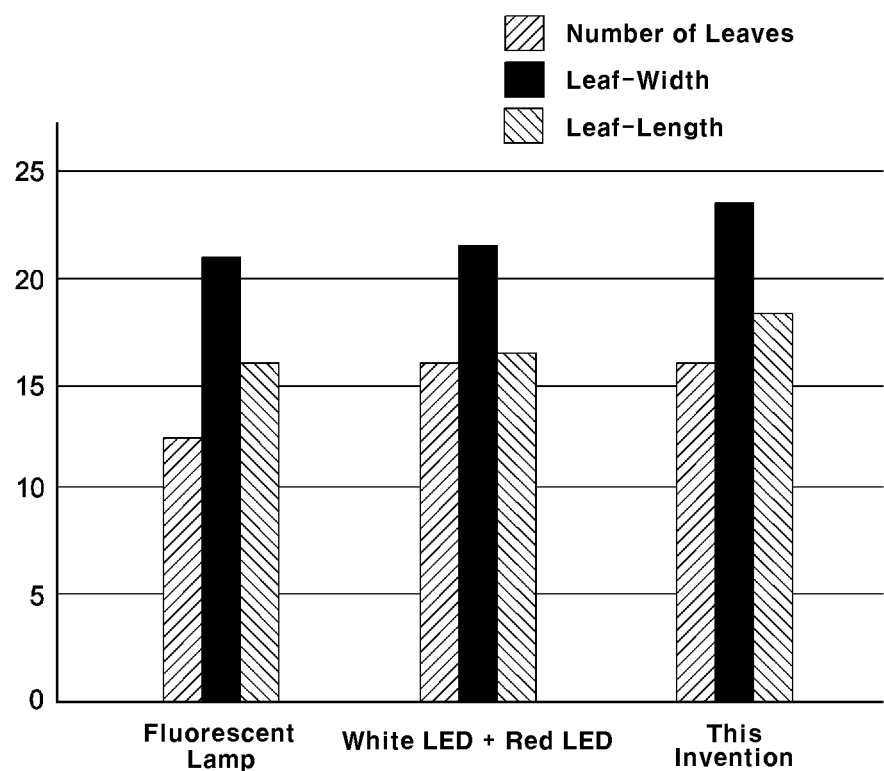
FIGS. 10 and 11 show comparison of growth status of "Lettuce" for each lighting apparatus.
Figure 11:
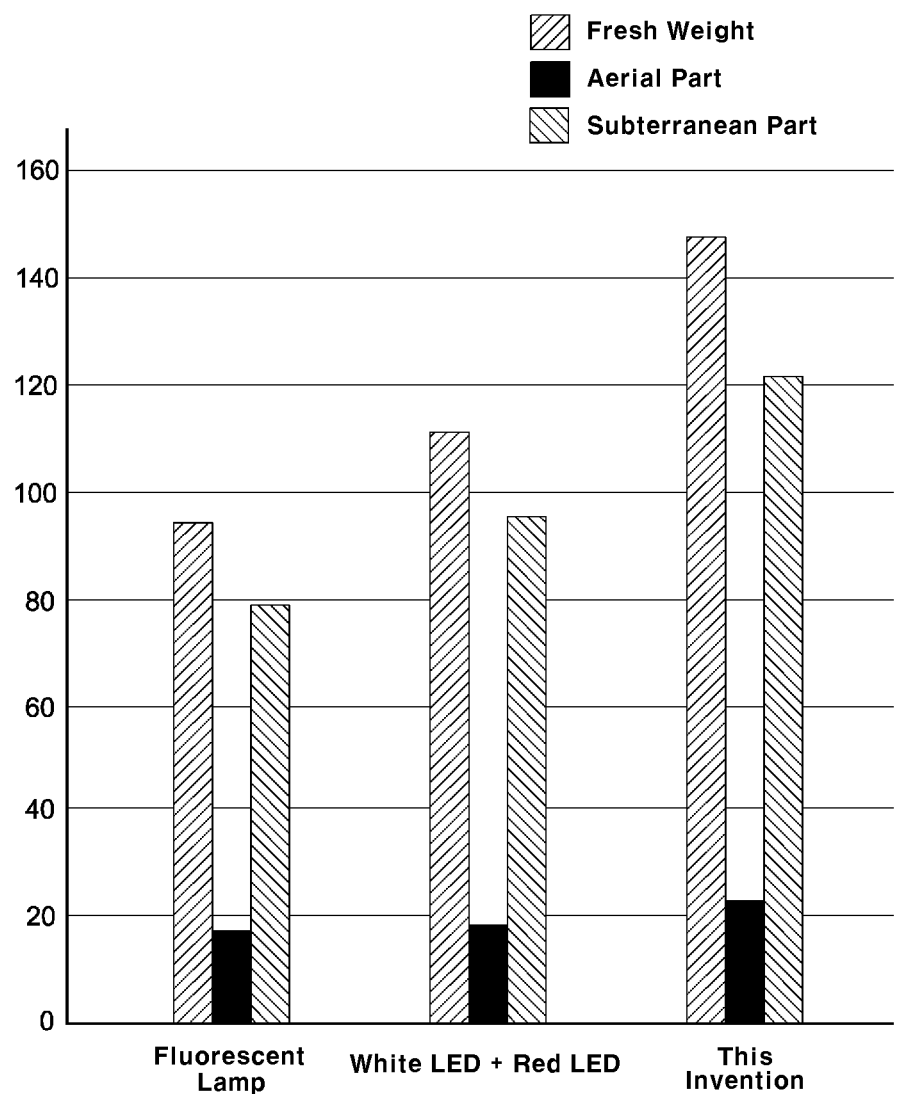

FIGS. 10 and 11 show comparison of growth status of "Lettuce" for fluorescent lamps, a lighting apparatus including combinations of white LEDs and red LEDs, and a lighting apparatus of the present invention.

Referring to FIGS. 10 and 11, the lighting apparatus including combinations of white LEDs and red LEDs shows rather inferior level of "Lettuce" growth to the lighting apparatus of the present invention (white LED), in which the red LEDs incorporates more expensive red-chips of high power consumption whereas the present invention incorporates cheaper blue-chips of low power consumption.

Figure 12:
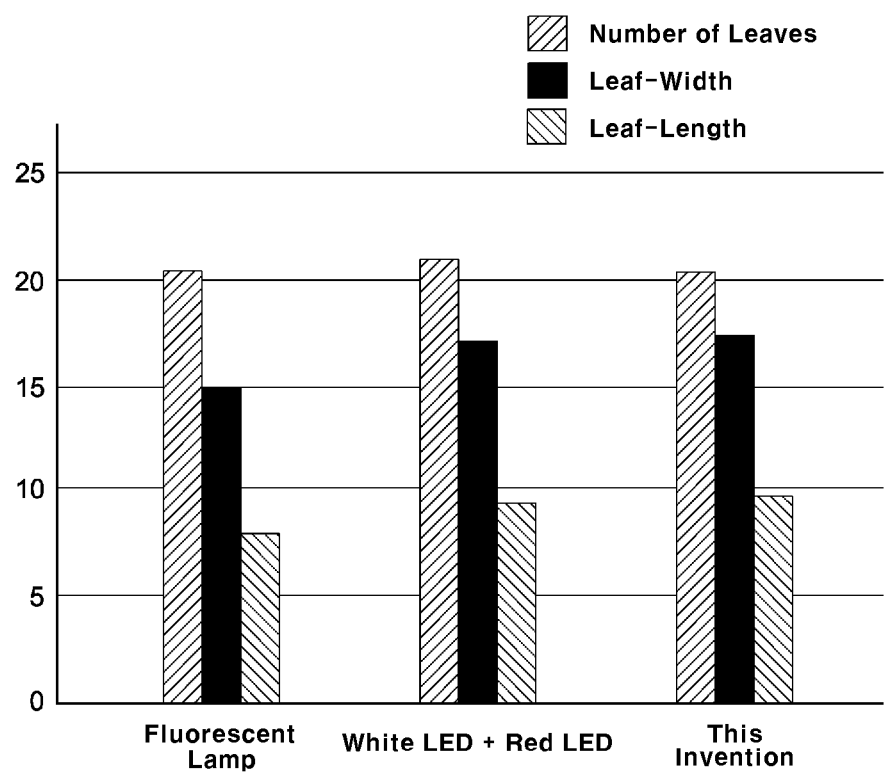
FIGS. 12 and 13 show comparison of growth status of "Caesars Green" for each lighting apparatus.
Figure 13:
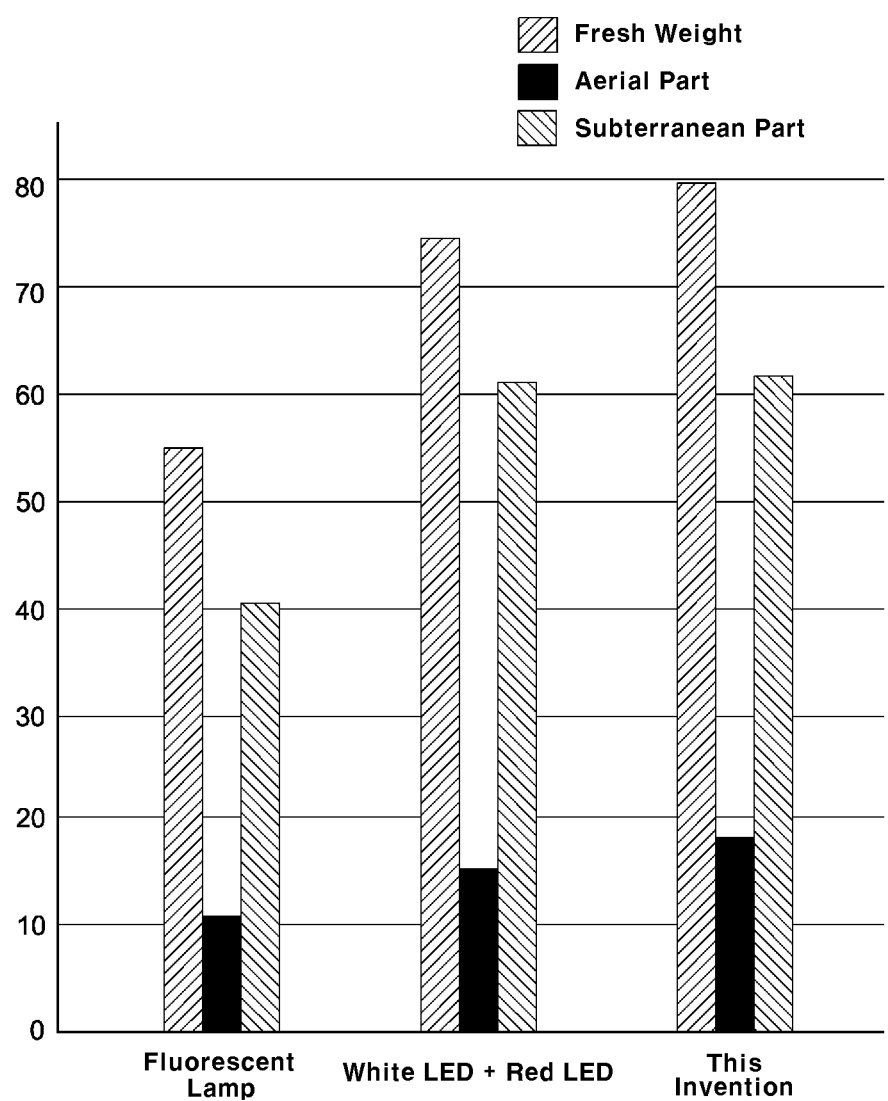

FIGS. 12 and 13 show comparison of growth status of "Caesars Green" for fluorescent lamps, a lighting apparatus including combinations of white LEDs and red LEDs, and a lighting apparatus of the present invention.

Referring to FIGS. 12 and 13, the lighting apparatus including combinations of white LEDs and red LEDs shows rather inferior level of "Caesars Green" growth to the lighting apparatus of the present invention (white LED), in which the red LEDs incorporates more expensive red-chips of high power consumption whereas the present invention incorporates cheaper blue-chips of low power consumption.

Figure 14:
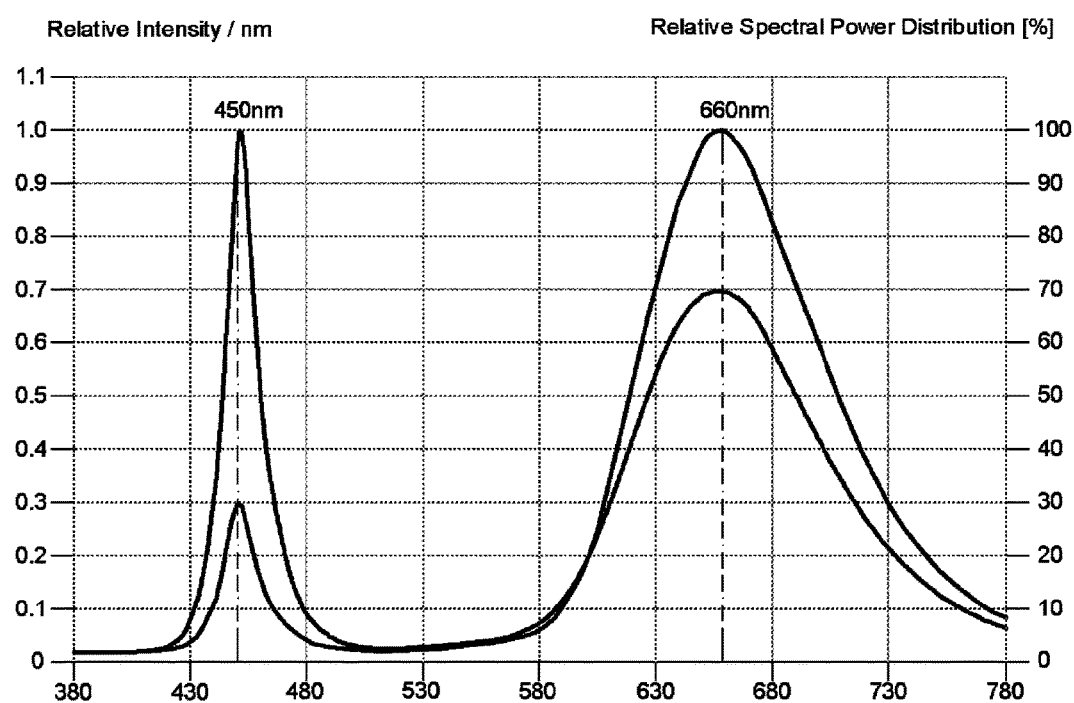
FIG. 14 shows an emission spectrum according to a first embodiment of mixing phosphor of the present invention.

FIG. 14 shows an emission spectrum for specific wavelength bands of LED lighting apparatuses for plant factories according to a first embodiment of mixing phosphor of the present invention. Referring to FIG. 14, the mixing phosphor 20 according to the first embodiment is made by blending red-series R-phosphor. The mixing phosphor 20 is applied on surface of the blue-chip light-source 10 so as to form particular light intensity by wavelength band which are confirming to specific plant groups.

It is preferable that the light intensity shows a first local maximum in 430 nm-470 nm wavelength band which is crucial to plant growth for particular plants, and further show a second local maximum in 600 nm-730 nm wavelength band which is also crucial to plant growth.

Further, it is preferable that both of minimum light intensities in 430 nm-470 nm and 600 nm-730 nm wavelength bands maintain higher than maximum light intensity in 490 nm-560 nm wavelength band. It is aiming to maintain focused light intensity in 430 nm-470 nm and 600 nm-730 nm wavelength bands which is crucial to plant growth, and to suppress light intensity in wavelength bands which is unfavorable to plant growth.

Figure 15:
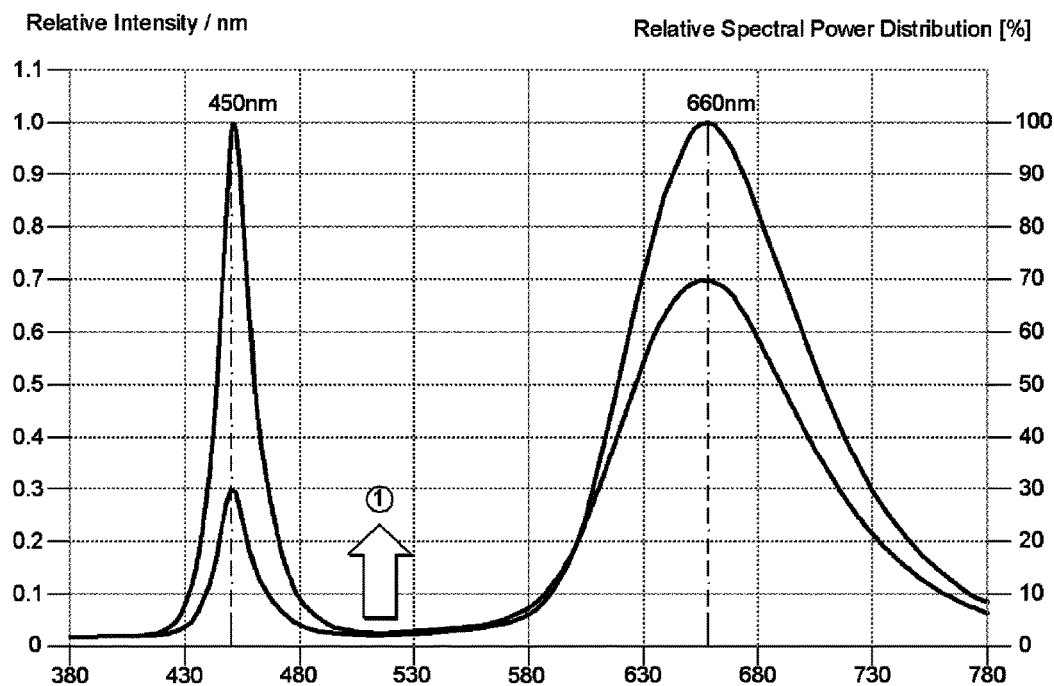
FIG. 15 shows an emission spectrum according to a second embodiment of mixing phosphor of the present invention.

FIG. 15 shows an emission spectrum for specific wavelength bands of LED lighting apparatuses for plant factories according to a second embodiment of mixing phosphor of the present invention. Referring to FIG. 15, the mixing phosphor 20 according to the second embodiment is made by blending red-series and green-series RG-phosphor. The mixing phosphor 20 is applied on surface of the blue-chip light-source 10 so as to form particular light intensity by wavelength band which are confirming to specific plant groups.

It is preferable that the light intensity shows a first local maximum in 430 nm-470 nm wavelength band which is crucial to plant growth for particular plants, and further show a second local maximum in 600 nm-730 nm wavelength band which is also crucial to plant growth.

Further, it is preferable that the light intensity shows a third local maximum in 490 nm-560 nm wavelength band, which is smaller than both of the first and the second local maximums. It is aiming to maintain focused light intensity in 430 nm-470 nm and 600 nm-730 nm wavelength bands which is crucial to plant growth, to suppress light intensity in wavelength bands which is unfavorable to plant growth, and to form the third local maximum in 490 nm-560 nm wavelength band, which is smaller than both of the first and the second local maximums so as to satisfy some plants which is requiring relatively higher light intensity in the 490 nm-560 nm wavelength band than other plants.

As shown in FIG. 15, in the second embodiment, light intensity graph moves to zone ① in approximately 510 nm wavelength band so as to form an upward convex shape.

Figure 16:
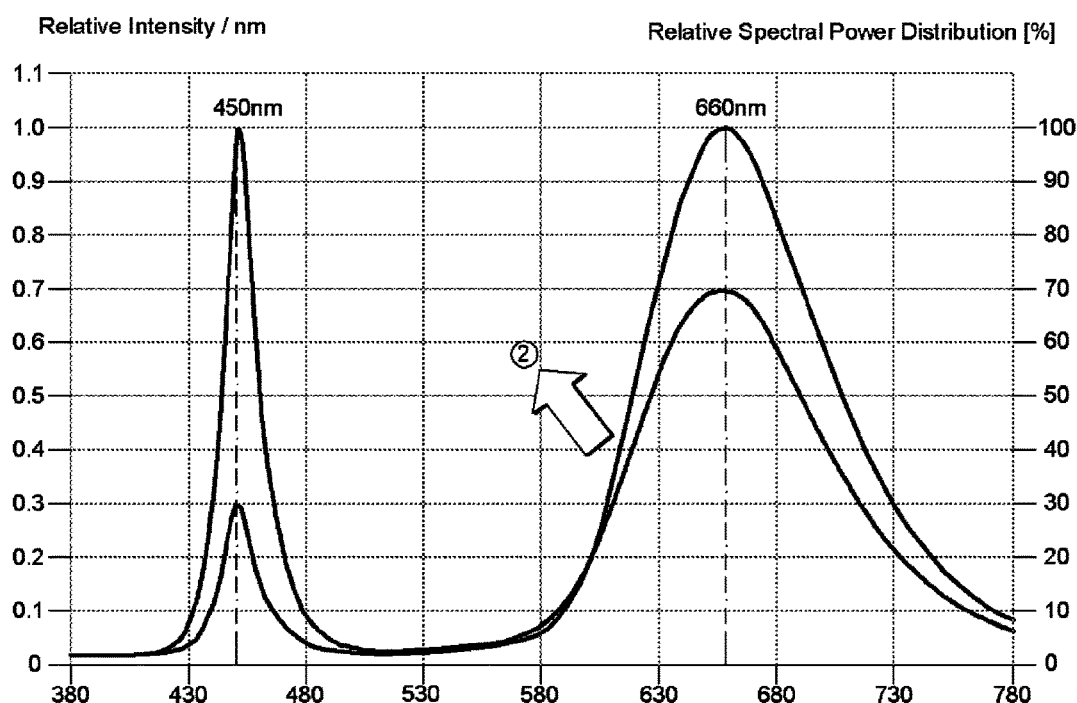
FIG. 16 shows an emission spectrum according to a third embodiment of mixing phosphor of the present invention.

FIG. 16 shows an emission spectrum for specific wavelength bands of LED lighting apparatuses for plant factories according to a third embodiment of mixing phosphor of the present invention. Referring to FIG. 16, the mixing phosphor 20 according to the third embodiment is made by blending red-series and yellow-series RY-phosphor. The mixing phosphor 20 is applied on surface of the blue-chip light-source 10 so as to form particular light intensity by wavelength band which are confirming to specific plant groups.

It is preferable that the light intensity shows a first local maximum in 430 nm-470 nm wavelength band which is crucial to plant growth for particular plants, and further show a second local maximum in 550 nm-730 nm wavelength band which is also crucial to plant growth.

Further, it is preferable that both of minimum light intensities in 430 nm-470 nm and 550 nm-730 nm wavelength bands maintain higher than maximum light intensity in 490 nm-530 nm wavelength band. It is aiming to maintain light intensity in the 550 nm-600 nm wavelength band relatively higher than those of the second embodiment.

As shown in FIG. 16, in the third embodiment, light intensity graph moves to zone ② in approximately 510 nm wavelength band so as to form an upper-left convex shape.

As also shown in FIGS. 14 to 16, in the first to third embodiments, the value of light intensities in the first and second local maximums may increase or decrease by the amount of the mixing phosphor 20 which is applied on the surface of the blue-chip light-source 10.

The invention claimed is:

1. An LED lighting module for being used in an LED lighting apparatus for plant factories, comprising:
   a blue-chip light-source for generating blue-series light under external power supply; and
   mixing phosphor, which being blending of red-series and yellow-series RY-phosphor, for being applied onto the blue-chip light-source, whereby the light intensity out of the blue-chip light-source shows a first local maximum in a 430 nm-470 nm wavelength band and a second local maximum in a 550 nm-730 nm wavelength band, wherein both of minimum light intensities in the 430 nm-470 nm wavelength band and the 550 nm-730 nm wavelength band maintain higher than maximum light intensity in a 490 nm-530 nm wavelength band.

2. An LED lighting apparatus for plant factories, comprising:
   LED lighting modules of claim 1;
   a circuit board for loading pluralities of the LED lighting modules and of having circuit pattern so as to provide on/off control for the LED lighting modules and to provide external power supply to the LED lighting modules; and
   a frame for fixing the circuit board with letting the bottom surface of the circuit board being landed.

3. The LED lighting apparatus for plant factories of claim 2, further comprising:
   a closing cover, being detachably attached to the bottom edges of the frame, for closing the circuit board and the LED lighting modules, wherein the circuit board being landed in the frame and the LED lighting modules being loaded in the circuit board.

4. The LED lighting apparatus for plant factories of claim 3, wherein the pluralities of LED lighting modules are in-line aligned with being equally-spaced in the circuit board.

* * * * *